US010142942B2

(12) United States Patent
Huang et al.

(10) Patent No.: US 10,142,942 B2
(45) Date of Patent: Nov. 27, 2018

(54) APPARATUS, COMPUTER READABLE MEDIUM, AND METHOD FOR SPATIAL REUSE IN A HIGH EFFICIENCY WIRELESS LOCAL-AREA NETWORK

(71) Applicant: Intel IP Corporation, Santa Clara, CA (US)

(72) Inventors: Po-Kai Huang, San Jose, CA (US); Robert J. Stacey, Portland, OR (US); Qinghua Li, San Ramon, CA (US); Rongzhen Yang, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/675,475

(22) Filed: Aug. 11, 2017

(65) Prior Publication Data

US 2018/0041967 A1    Feb. 8, 2018

Related U.S. Application Data

(63) Continuation of application No. 14/751,561, filed on Jun. 26, 2015, now Pat. No. 9,749,964.
(Continued)

(51) Int. Cl.
*H04W 52/18* (2009.01)
*H04W 74/00* (2009.01)
(Continued)

(52) U.S. Cl.
CPC ............. *H04W 52/18* (2013.01); *H04L 69/22* (2013.01); *H04W 74/002* (2013.01);
(Continued)

(58) Field of Classification Search
CPC ............... H04W 52/18; H04W 74/002; H04W 74/0816
See application file for complete search history.

(56) References Cited

U.S. PATENT DOCUMENTS 7,162,732 B2    1/2007  Ovadia
9,749,964 B2    8/2017  Huang et al.
(Continued)

OTHER PUBLICATIONS

U.S. Appl. No. 14/751,561 U.S. Pat. No. 9,749,964, filed Jun. 26, 2015, Apparatus, Computer Readable Medium, and Method for Spatial Reuse in a High Efficiency Wireless Local-Area Network.
(Continued)

*Primary Examiner* — Ronald B Abelson
(74) *Attorney, Agent, or Firm* — Schwegman Lundberg & Woessner, P.A.

(57) ABSTRACT

Apparatus, computer readable medium, and method for generating and receiving signal fields in a high efficiency wireless local-area network (WLAN) are disclosed. A high-efficiency wireless local-area network (HEW) device including circuitry is disclosed. The circuitry may be configured to: receive a physical (PHY) header or media access control (MAC) header from a second HEW station, wherein the PHY header or MAC header comprises an indication of a spatial reuse opportunity and a defer duration; adjust one or more parameters to determine whether or not the wireless medium is in use; and determine whether to transmit within the spatial reuse opportunity based on the adjusted one or more parameters. The circuitry may be configured to adjust one or more parameters to determine whether or not the wireless medium is in use in where the parameters are signal detect (SD) threshold, a mid-packet detection (MPD) threshold, and an energy detection (ED) threshold.

23 Claims, 5 Drawing Sheets

Related U.S. Application Data (60) Provisional application No. 62/127,976, filed on Mar. 4, 2015, provisional application No. 62/072,318, filed on Oct. 29, 2014.

(51) Int. Cl.
*H04W 74/08* (2009.01)
*H04L 29/06* (2006.01)
*H04W 52/24* (2009.01)
*H04W 84/12* (2009.01)

(52) U.S. Cl.
CPC ...... *H04W 74/0816* (2013.01); *H04W 52/247* (2013.01); *H04W 52/248* (2013.01); *H04W 84/12* (2013.01)

(56) References Cited

U.S. PATENT DOCUMENTS

| | | |
|---|---|---|
| 2013/0294354 A1 | 11/2013 | Zhang et al. |
| 2015/0358904 A1* | 12/2015 | Kwon ............... H04W 52/0206 370/252 |
| 2016/0066257 A1 | 3/2016 | Liu et al. |
| 2016/0128074 A1 | 5/2016 | Huang et al. |
| 2017/0294949 A1* | 10/2017 | Zhang ................. H04B 7/0617 |

OTHER PUBLICATIONS

"U.S. Appl. No. 14/751,561, Non Final Office Action dated Dec. 5, 2016", 8 pgs.
"U.S. Appl. No. 14/751,561, Notice of Allowance dated Apr. 25, 2017", 5 pgs.
"U.S. Appl. No. 14/751,561, Response filed Apr. 5, 2017 to Non Final Office Action dated Dec. 5, 2016", 10 pgs.

* cited by examiner

APPARATUS, COMPUTER READABLE MEDIUM, AND METHOD FOR SPATIAL REUSE IN A HIGH EFFICIENCY WIRELESS LOCAL-AREA NETWORK

PRIORITY CLAIM

This application is a continuation of U.S. patent application Ser. No. 14/751,561, filed Jun. 26, 2015, which claims the benefit of priority under 35 USC 119(e) to U.S. Provisional Patent Application Ser. No. 62/127,976, filed Mar. 4, 2015, and U.S. Provisional Patent Application Ser. No. 62/072,318, filed Oct. 29, 2014, each of which are incorporated herein by reference in their entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to methods and devices for spatial reuse. Some embodiments relate to methods and devices for deferral rules for spatial reuse. Some embodiments relate to power adjustment for spatial reuse.

BACKGROUND

Efficient use of the resources of a wireless local-area network (WLAN) is important to provide bandwidth and acceptable response times to the users of the WLAN. One way to increase the efficiency of a WLAN is spatial re-use where wireless devices may spatially reuse frequencies of the wireless medium. However, often spatial reuse is difficult to achieve. Moreover, wireless devices need to operate with both newer protocols and with legacy devices.

Thus, there are general needs for improved methods, apparatuses, and computer readable media for spatial reuse in WLANs.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
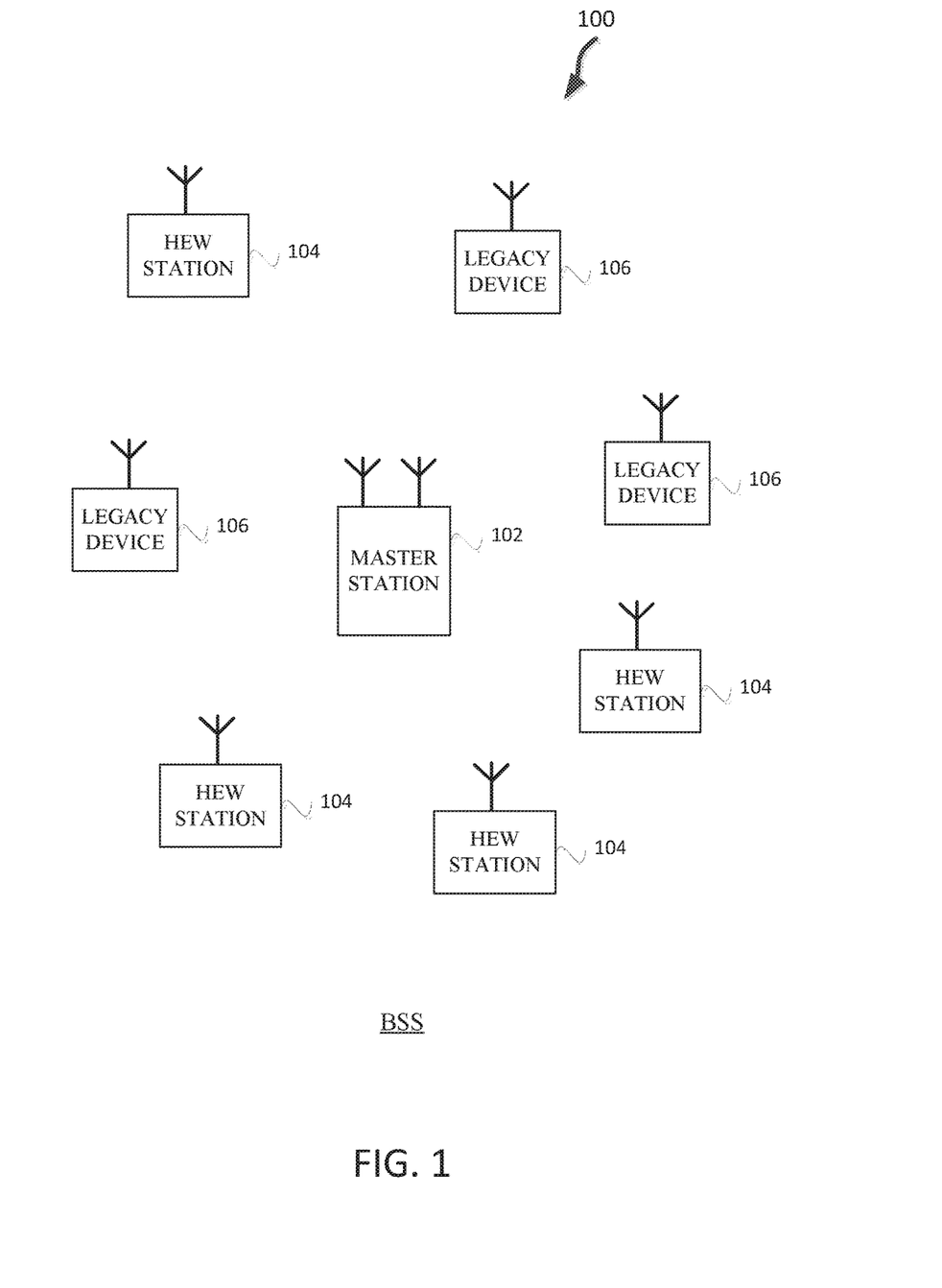
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-5 such as performing spatial reuse by using deferral rules.

Figure 2:
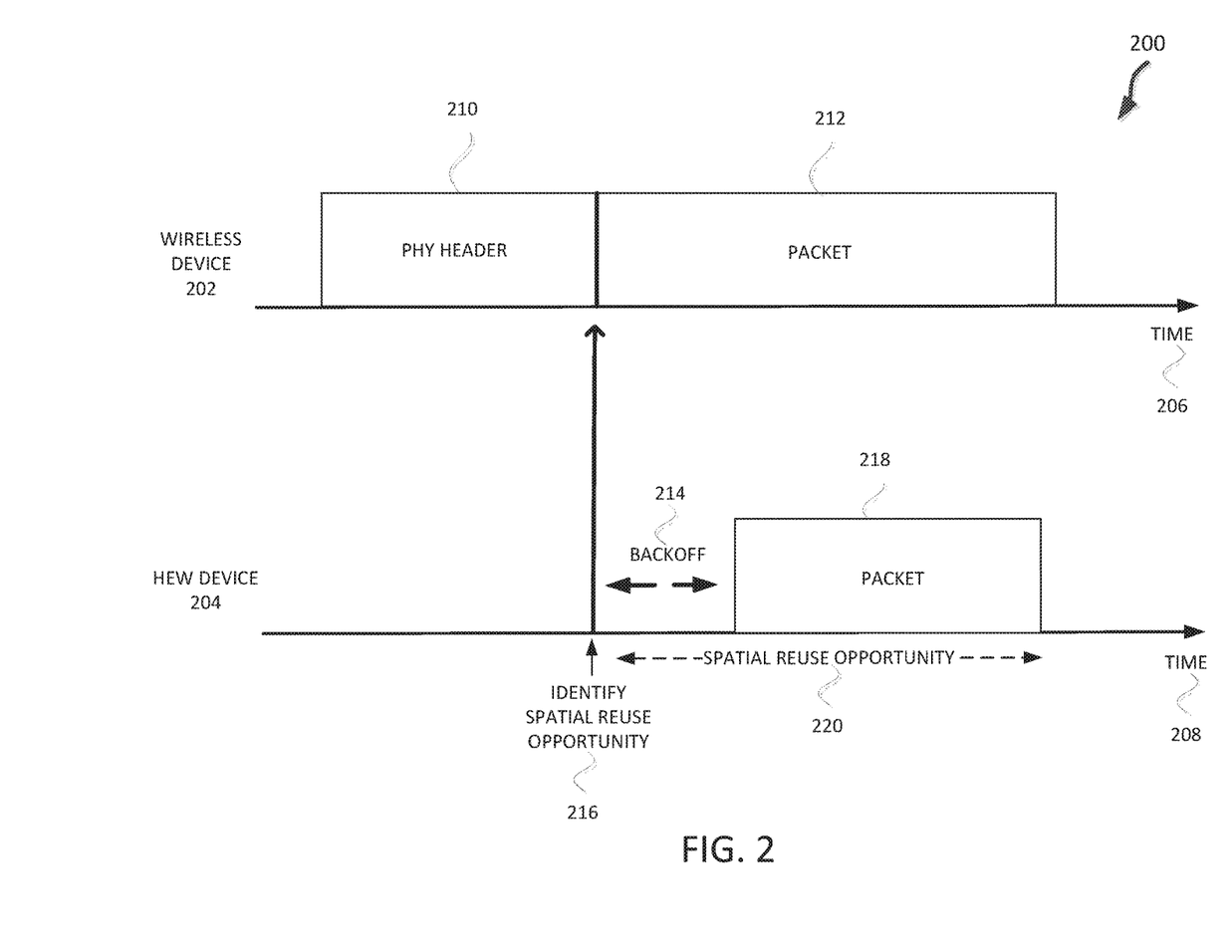
FIG. 2 illustrates a spatial reuse in accordance with some embodiments.

FIG. 2 illustrates a spatial reuse 200 in accordance with some embodiments. Illustrated in FIG. 2 are a wireless device 202, a HEW device 204, time 206 along a horizontal axis, time 208 along a horizontal axis, PHY header 210, a packet 212, a back-off 214, a time 216, a packet 218, and a spatial reuse opportunity 220.

The wireless device 202 may be a master station 102, HEW station 104, or a legacy device 106. The HEW device 204 may be a master station 102 or HEW station 104. The wireless device 202 transmits packet 212 with a PHY header 210. The HEW device 204 at time 216 identifies a spatial reuse opportunity 220. The HEW device 204 may identify the spatial reuse opportunity 220 based on an indication in the PHY header 210 that there is a spatial reuse opportunity 220. The PHY header 210 may include an indication of one or more parameters for the HEW device 204 to use within the spatial reuse opportunity 220. For example, the PHY header 210 may include a transmission power and/or a backoff window size for the HEW device 204 to use.

The HEW device 204 may then attempt to use the spatial reuse opportunity 220. The HEW device 204 may perform a clear-channel assessment (CCA) with a backoff 214 window. The HEW device 204 may backoff 214 for a time before performing the CCA. The HEW device 204 may modify one or more parameters of the window and/or CCA parameters as described in conjunction with FIG. 4. The HEW device 204 may then transmit a packet 218 within the spatial reuse opportunity 220. As described in conjunction with FIG. 4, the HEW device 204 may adjust the transmit power, CCA parameters, and/or the backoff window for the spatial reuse opportunity 220.

Figure 3:
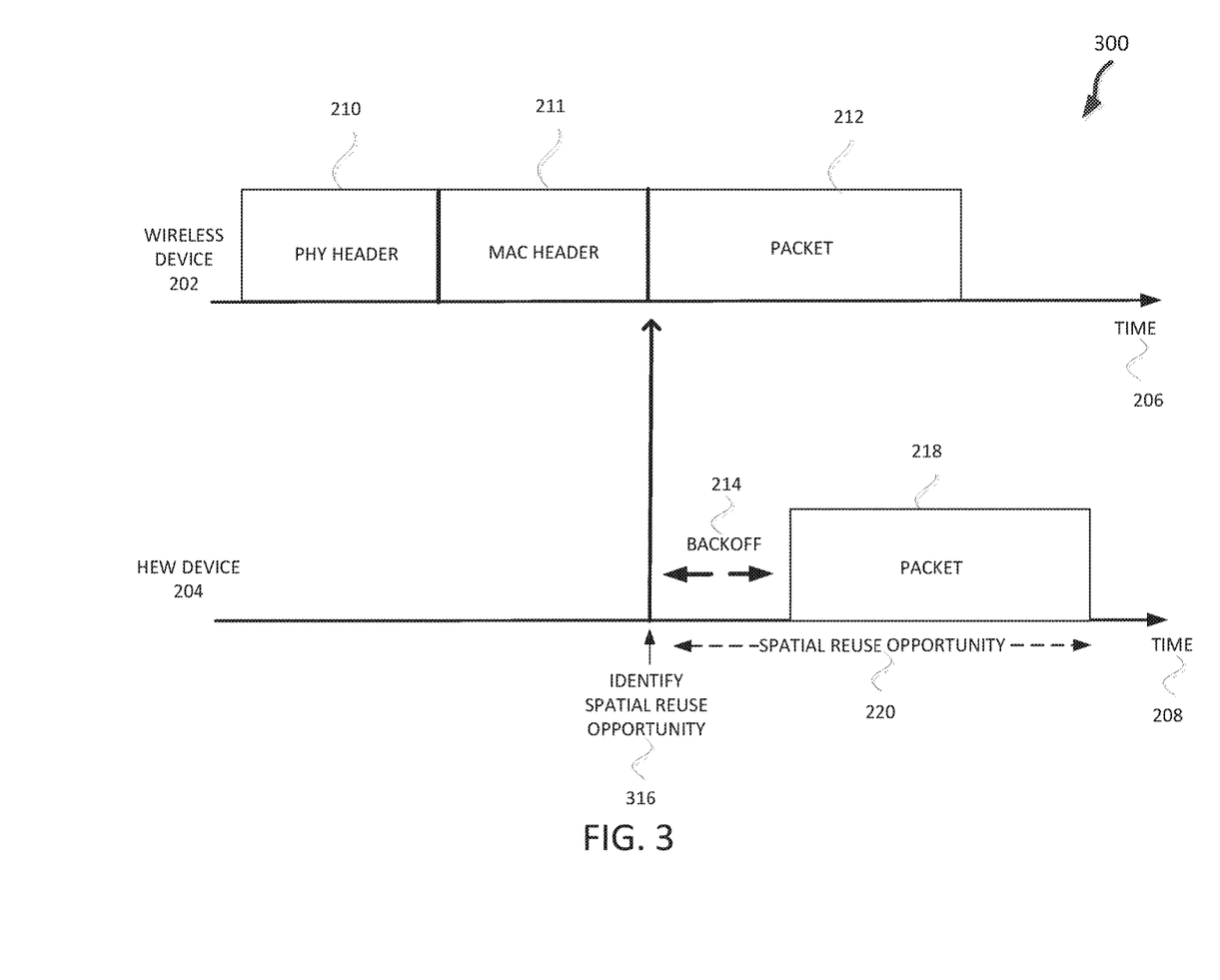
FIG. 3 illustrates a spatial reuse in accordance with some embodiments.

FIG. 3 illustrates a spatial reuse 300 in accordance with some embodiments. Illustrated in FIG. 3 are a wireless device 202, HEW device 204, time 206 along a horizontal axis, time 208 along a horizontal axis, PHY header 210, a packet 212, a back-off 214, a time 316, a packet 218, and a spatial reuse opportunity 220.

The wireless device 202 transmits packet 212 with a PHY header 210 and a MAC header 211. The HEW device 204 at time 316 identifies a spatial reuse opportunity 220. The HEW device 204 may identify the spatial reuse opportunity 220 based on an indication in the MAC header 211 that there is a spatial reuse opportunity 220. The MAC header 211 and/or PHY header 210 may include an indication of one or more parameters for the HEW device 204 to use within the spatial reuse opportunity 220. For example, the MAC header 211 may include a transmission power and/or a backoff window size for the HEW device 204 to use.

Spatial reuse may be important for efficiently using the resources of a wireless local-area network (WLAN). In example embodiments, spatial reuse may be achieved by changing the deferral behaviors of the HEW stations 104, master station 102, and/or legacy devices 106 because the system performance may depend at least partially on the deferral behavior of the HEW stations 104, master station 102, and/or legacy devices 106.

In example embodiments, the CCA and the transmission power of the wireless devices 102, 104, 106 are used to control deferral behavior. The optimal threshold and power often depend on the topology. Further, it may take lots of signaling among wireless devices 102, 104, 106 to convey the information so that a suitable threshold and power can be decided.

Figure 4:
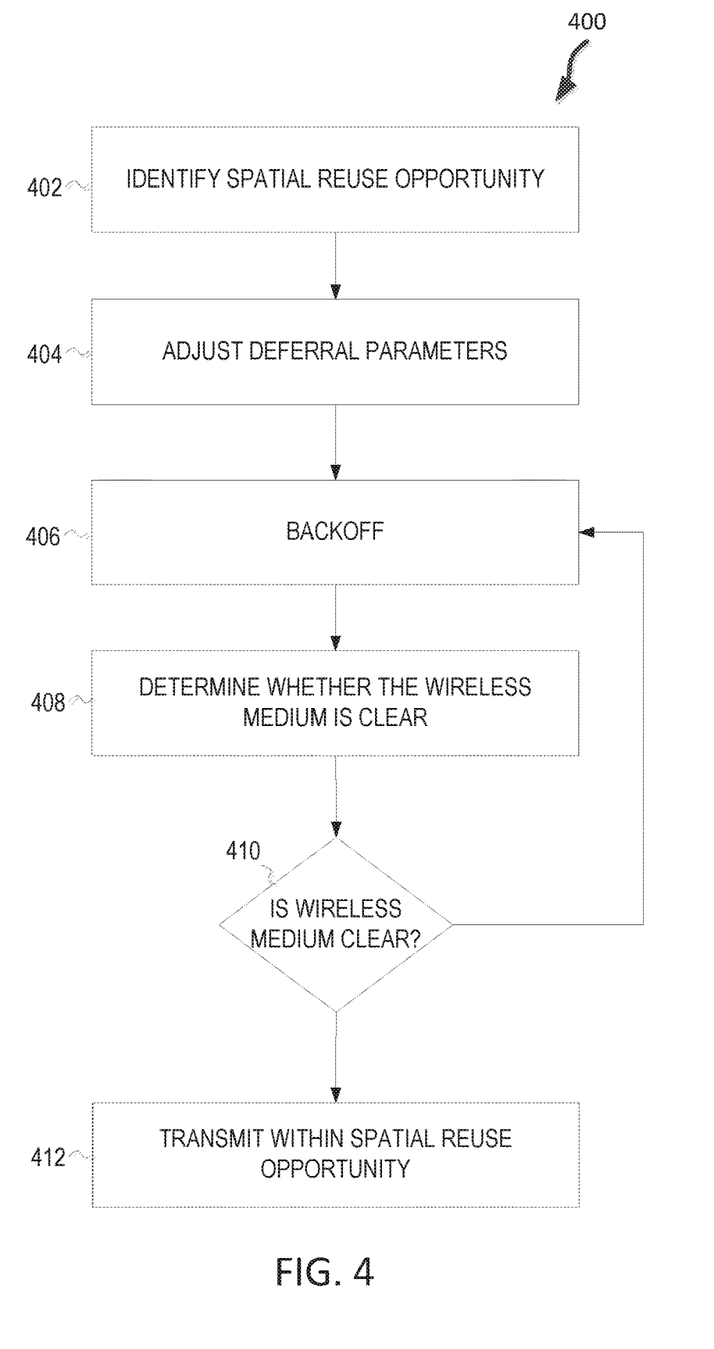
FIG. 4 illustrates a method for spatial reuse in accordance with some embodiments.

FIG. 4 illustrates a method 400 for spatial reuse in accordance with some embodiments. The method 400 may begin at operation 402 with identify spatial reuse opportunity. For example, referring to FIGS. 2 and 3, a PHY header 210 and/or MAC header 211 may include an indication that there is a spatial reuse opportunity 220. The HEW device 204 may receive the PHY header 210 and/or MAC header 211 and identify the spatial reuse opportunity 220.

The method 400 continues at operation 404 with adjust deferral parameters. For example, in some embodiments a HEW station 104 may ignore the medium busy signaling due to a CCA threshold.

The HEW station 104 and/or master station 102 may also ignore one or more of the thresholds used for CCA, which may include an energy detection (ED) threshold, a signal detect (SD) threshold, and a mid-packet detection (MPD) threshold. For example, the HEW station 104 may determine the CCA by ignoring the SD threshold and using the ED threshold to determine whether or not the channel is busy.

The HEW station 104 and/or master station 102 may ignore the power of the PHY header 210 and/or MAC header 211 when determining SD, ED, or MPD. For example, referring to FIGS. 2 and 3, the HEW device 204 may determine a power, X, of the received PHY header 210 and/or MAC header 211, and then during after the backoff 214, subtract X from the SD, ED, and/or MPD when determining the CCA and whether or not the SD, ED, and/or MPD threshold is exceeded.

The HEW station 104 and/or master station 102 may exclude the total power of the IEEE 802.11 signals, T, from the MPD threshold. For example, the HEW device 204 may determine T when the HEW device 204 receives the PHY header 210 and/or the MAC header 211, and then may subtract T from the power of the IEEE 802.11 signals after the backoff 214 when determining CCA and whether or not the MPD threshold is exceeded.

In some embodiments the HEW station 104 may raise a CCA threshold including SD, ED, and/or MPD for a period of time after receiving the indication of the spatial reuse opportunity. For example, referring to FIGS. 2 and 3, the HEW device 204 may raise one or more thresholds of SD, ED, and/or MDP after receiving the PHY header 210 and/or MAC header 211. The HEW device 204 may keep the higher threshold for the duration of the spatial reuse opportunity 220.

The ED threshold may be modified to Z+Total Power, where Total Power is the total power of all the signals received by the HEW station 104. Z may be an value such as an integer. For example, the HEW device 204 may measure the Total Power when receiving the PHY header 210 and/or MAC header 211. The HEW device 204 may then change the ED threshold to Z+Total Power and then use the modified ED threshold during the spatial reuse opportunity 220 or for another duration.

In some embodiments, the HEW station 104 may adjust the ED threshold according to Z+(Total Power−X), where Total Power and X are as defined above. For example, the HEW device 204 may determine the Total Power of all signals received during the reception of the PHY header 210 and/or MAC header 211 and the power, X of the PHY header 210 and/or MAC header 211. The HEW device 204 may then set the ED threshold to be Z+(Total Power−X) for the duration of the spatial reuse opportunity 220 or for another duration. In some embodiments, the HEW station 104 may not change the ED threshold.

The HEW station 104 and/or master station 102 may adjust the MPD threshold according to Z+T, where T is as defined above the power of the IEEE 802.11 signals, and Z is a constant or an integer. For example, referring to FIGS. 2 and 3, the HEW device 204 may determine T when the PHY header 210 and/or MAC header 211 is received and adjust the MPD threshold to Z+T for the duration of the spatial reuse opportunity 220 or for another duration.

The HEW station 104 and/or master station 102 may adjust the MPD threshold to be Z+(T−X) where T and X are as defined above. For example, the HEW device 204, referring to FIGS. 2 and 3, may determine T the total power of all the IEEE 802.11 signals for T and the power of the PHY header 210 and/or MAC header 211 for X. The HEW device 204 may then set the MPD threshold for the duration of the spatial reuse opportunity 220 or for another duration.

The HEW station 104 and/or master station 102 may adjust the MPD to be Z+X, where Z and X are as defined above. For example, the HEW device 204, referring to FIGS. 2 and 3, may measure the power of the PHY header 210 and/or MAC header 211 as X, and then adjust the MDP threshold to be Z+X for the spatial reuse opportunity 220 or another duration.

The HEW station 104 and/or master station 102 may adjust the SD threshold to Z+Total Power where Z and Total Power are as defined above. For example, the HEW device 204, referring to FIGS. 2 and 3, may determine the Total Power of all the signals received when the PHY header 210 and/or MAC header 211 are received. The HEW device 204 may then adjust the SD to Z+Total Power for the spatial reuse opportunity 220 or another duration. In some embodiments raising the SD to Z+Total Power will have the following technical effect. New incoming IEEE 802.11 signals with signal strength, N, where N is a power less than Total Power, will have a signal to noise ratio (SINR) of N/(Total Power+N), which will be a low number, and hence the new signal will likely fail. Hence, raising SD to Z+Total Power may have the effect of ignoring any new signal that has a power less than the Total Power.

The HEW station 104 may determine to maintain the conditions that SD threshold is less than the MPD threshold and that the MPD threshold is less than the ED threshold.

The HEW station 104 and/or master station 102 may set one or more of the ED threshold, MPD threshold, and/or SD threshold. Z may be defined in a communication protocol such as IEEE 802.11ax. In some embodiments Z may be signaled by the master station 102 and/or a HEW station 104. In some embodiments Z may be signaled in the PHY header and/or the MAC header. In some embodiments Z may be negotiated and used among more than one HEW station 104 and/or master station 102.

The method 400 continues at operation 406 with backoff. For example, the HEW device, referring to FIGS. 2 and 3, may determine a window for backing off, and backoff 214 for the duration of the window. In some embodiments the HEW station 104 may use the current backoff window size.

In some embodiments the HEW station 104 may have a separate window for backoff within the spatial reuse opportunity. The window value may be signaled in the PHY header and/or MAC header. The window value may be based on a window value from a previous spatial reuse opportunity. The window value may be a new random value such as a value between 0 and 16. The update of the window inside the spatial reuse opportunity may be independent from the update of the window outside the spatial reuse opportunity.

The method 400 continues at operation 408 with determine whether the wireless medium is clear. For example, the HEW device 204 may determine using the one or more adjusted CCA thresholds whether or not the wireless medium is clear for transmitting after the backoff 214. The HEW device 204 may measure the signals only on a sub-channel of the wireless medium. All of the CCA thresholds may be adjusted based on measurements of a sub-channel of the wireless medium such as X, T, and Total Power may be measured for a sub-channel or a portion of the wireless medium.

The method 400 continues at operation 410 with is wireless medium clear. If the wireless medium is determined to be clear by the CCA, then the method 400 continues at operation 412 with transmit within spatial reuse opportunity. For example, the HEW station 104 and/or master station 102 may transmit a packet or frame. For example, HEW device 204, referring to FIGS. 2 and 3, may transmit packet 218.

If the wireless medium is determined not to be clear by CCA, then the method 400 may return to backoff where the HEW station 104 may backoff for a time period. The method 400 may end within or after the spatial reuse opportunity.

Figure 5:
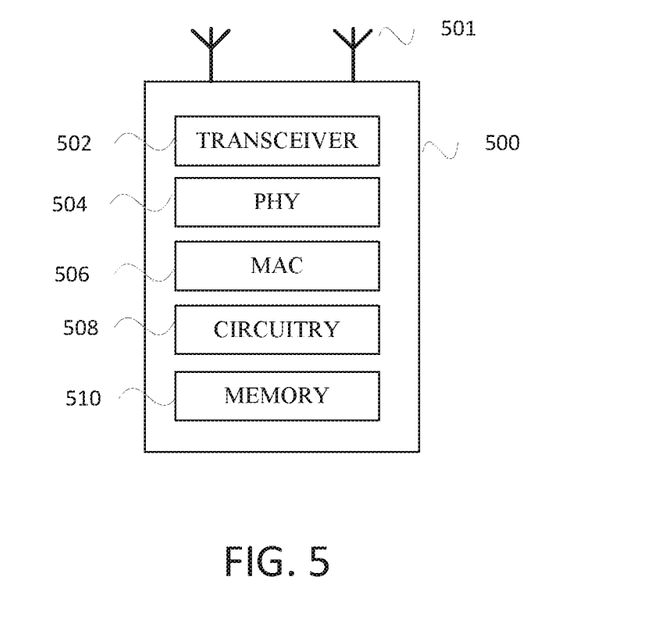
FIG. 5 illustrates a HEW station in accordance with some embodiments.

FIG. 5 illustrates a HEW device in accordance with some embodiments. HEW device 500 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 500 may be suitable for operating as master station 102 (FIG. 1) or a HEW STA 104 (FIG. 1). In accordance with embodiments, HEW device 500 may include, among other things, a transmit/receive element 501 (for example an antenna), a transceiver 502, physical (PHY) circuitry 504, and media access control (MAC) circuitry 506. PHY circuitry 504 and MAC circuitry 506 may be HEW compliant layers and may also be compliant with one or more legacy IEEE 802.11 standards. MAC circuitry 506 may be arranged to configure packets such as a physical layer convergence procedure (PLCP) protocol data unit (PPDUs) and arranged to transmit and receive PPDUs, among other things. HEW device 500 may also include circuitry 508 and memory 510 configured to perform the various operations described herein. The circuitry 508 may be coupled to the transceiver 502, which may be coupled to the transmit/receive element 501. While FIG. 5 depicts the circuitry 508 and the transceiver 502 as separate components, the circuitry 508 and the transceiver 502 may be integrated together in an electronic package or chip.

In some embodiments, the MAC circuitry 506 may be arranged to contend for a wireless medium during a contention period to receive control of the medium for the HEW control period and configure an HEW PPDU. In some embodiments, the MAC circuitry 506 may be arranged to contend for the wireless medium based on channel contention settings, a transmitting power level, and a CCA level.

The PHY circuitry 504 may be arranged to transmit the HEW PPDU. The PHY circuitry 504 may include circuitry for modulation/demodulation, upconversion/downconversion, filtering, amplification, etc. In some embodiments, the circuitry 508 may include one or more processors. The circuitry 508 may be configured to perform functions based on instructions being stored in a RAM or ROM, or based on special purpose circuitry. The circuitry 508 may be termed processing circuitry in accordance with some embodiments. The circuitry 508 may include a processor such as a general purpose processor or special purpose processor. The circuitry 508 may implement one or more functions associated with transmit/receive elements 501, the transceiver 502, the PHY circuitry 504, the MAC circuitry 506, and/or the memory 510.

In some embodiments, the circuitry 508 may be configured to perform one or more of the functions and/or methods described herein and/or in conjunction with FIGS. 1-5 such as performing spatial reuse by using deferral rules.

In some embodiments, the transmit/receive elements 501 may be two or more antennas that may be coupled to the PHY circuitry 504 and arranged for sending and receiving signals including transmission of the HEW packets. The transceiver 502 may transmit and receive data such as HEW PPDU and packets that include an indication that the HEW device 500 should adapt the channel contention settings according to settings included in the packet. The memory 510 may store information for configuring the other circuitry to perform operations for configuring and transmitting HEW packets and performing the various operations to perform one or more of the functions and/or methods described herein and/or in conjunction with FIGS. 1-5 such as performing spatial reuse by using deferral rules.

In some embodiments, the HEW device 500 may be configured to communicate using OFDM communication signals over a multicarrier communication channel. In some embodiments, HEW device 500 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 500 may use 4× symbol duration of 802.11n or 802.11ac.

In some embodiments, an HEW device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 501 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency wireless local-area network (HEW) device. The apparatus including circuitry configured to: receive a physical (PHY) header or media access control (MAC) header from a second HEW station, wherein the PHY header or MAC header comprises an indication of a spatial reuse opportunity; adjust one or more parameters to determine whether or not the wireless medium is in use; and determine whether to transmit within the spatial reuse opportunity based on the adjusted one or more parameters.

In Example 2, the subject matter of Example 1 can optionally include where the circuitry is further configured to: backoff after the indication of the spatial reuse opportunity is received, where a window for the backoff is one from the following group: an existing backoff window for deferral and a separate window for backoff within the spatial reuse opportunity; and determine a clear channel assessment (CCA) after the backoff, wherein the CCA is determined based on the adjusted one or more parameters.

In Example 3, the subject matter of Example 2 can optionally include where the separate window for backoff within the spatial reuse opportunity is one from the following group: a random value zero or greater and a value based on an updated value from a previous spatial reuse opportunity.

In Example 4, the subject matter of Example 2 can optionally include where the circuitry is further configured to: if it is determined that the CCA indicates a channel is clear for the HEW device to transmit, transmit a packet.

In Example 5, the subject matter of Example 4 can optionally include where the circuitry is further configured to: transmit the packet with a target power or lower, where the target power is one or more from the following group: a sent transmit power indicated in the PHY header or the MAC header, a standard power indicated in a communication protocol specification for use within spatial reuse opportunities, and a reduced power that is lower than a normal power.

In Example 6, the subject matter of Example 5 can optionally include where the circuitry is further configured to: reduce a modulation and coding scheme to accommodate the target power.

In Example 7, the subject matter of any of Examples 1-6 can optionally include where the circuitry is further configured to: determine a power of the PHY header or MAC header, and adjust one or more parameters so that the power of the PHY header or MAC header is excluded from the determination of one or more of the following group: an energy detection (ED) threshold, a signal detect (SD) threshold, and a mid-packet detection (MPD) threshold.

In Example 8, the subject matter of any of Examples 1-7 can optionally include where the circuitry is further configured to: determine a total power received within the PHY header or MAC header, and adjust one or more thresholds to be the total power plus a constant, where the one or more thresholds is one or more of the following group: an energy detection (ED) threshold, a signal detect (SD) threshold, and a mid-packet detection (MPD) threshold.

In Example 9, the subject matter of any of Examples 1-8 can optionally include where the circuitry is further configured to: determine a total power received within the PHY header or MAC header and a power of the PHY header or MAC header, and adjust one or more thresholds to be the total power received minus the power of the PHY header or MAC header plus a constant, wherein the one or more thresholds is one or more of the following group: an energy detection (ED) threshold, a signal detect (SD) threshold, and a mid-packet detection (MPD) threshold.

In Example 10, the subject matter of any of Examples 1-9 can optionally include where the circuitry is further configured to: if it is determined not to transmit within the spatial reuse opportunity, defer based on a deferral duration in the PHY header or MAC header.

In Example 11, the subject matter of any of Examples 1-10 can optionally include where the circuitry is further configured to: adjust one or more parameters to determine whether or not the wireless medium is in use in accordance with the following conditions: a signal detect (SD) threshold is less than a mid-packet detection (MPD) threshold and the MPD is then than an energy detection (ED) threshold.

In Example 12, the subject matter of any of Examples 1-11 can optionally include where the circuitry is further configured to: adjust one or more of the following parameters of clear-channel assessment: a signal detect (SD) threshold, a mid-packet detection (MPD) threshold, and an energy detection (ED) threshold.

In Example 13, the subject matter of any of Examples 1-12 can optionally include where the circuitry is configured to operate in accordance with orthogonal frequency-division multiple access (OFDMA) and Institute of Electronic and Electrical Engineers (IEEE) 802.11ax.

In Example 14, the subject matter of any of Examples 1-13 can optionally include where the HEW device is one from the following group: a HEW access point and a HEW station.

In Example 15, the subject matter of any of Examples 1-14 can optionally include where the circuitry further comprises processing circuitry and transceiver circuitry.

In Example 16, the subject matter of any of Examples 1-15 can optionally include memory coupled to the circuitry; and, one or more antennas coupled to the circuitry.

Example 17 is a method performed by a high-efficiency wireless local-area network (HEW) station. The method including receiving a physical (PHY) header or media access control (MAC) header from a second HEW station, wherein the PHY header or MAC header comprises an indication of a spatial reuse opportunity; adjusting one or more parameters to determine whether or not the wireless medium is in use; and determining whether to transmit within the spatial reuse opportunity based on the adjusted one or more parameters.

In Example 18, the subject matter of Example 17 can optionally include backing off after the indication of the spatial reuse opportunity is received, wherein a window for the backoff is one from the following group: an existing backoff window for deferral and a separate window for backoff within the spatial reuse opportunity; and determining a clear channel assessment (CCA) after the backoff, wherein the CCA is determined based on the adjusted one or more parameters.

In Example 19, the subject matter of Example 18 can optionally include where the separate window for backoff within the spatial reuse opportunity is one from the following group: a random value and a value based on an updated value from a previous spatial reuse opportunity.

In Example 20, the subject matter of Example 19 can optionally include transmitting a packet, if it is determined that the CCA indicates a channel is clear for the HEW device to transmit.

In Example 21, the subject matter of Example 20 can optionally include transmitting the packet with a target power or lower, wherein the target power is one or more from the following group: a sent transmit power indicated in the PHY header or the MAC header, a standard power indicated in a communication protocol specification for use within spatial reuse opportunities, and a reduced power that is lower than a normal power.

In Example 22, the subject matter of any of Examples 17-21 can optionally include adjusting one or more parameters to determine whether or not the wireless medium is in use in accordance with the following conditions: a signal detect (SD) threshold is less than a mid-packet detection (MPD) threshold and the MPD is then than an energy detection (ED) threshold.

Example 23 is a non-transitory computer-readable storage medium that stores instructions for execution by one or more processors, the instructions to configure the one or more processors to cause a high-efficiency wireless local-area network (HEW) device to: receive a physical (PHY) header or media access control (MAC) header from a second HEW station, wherein the PHY header or MAC header comprises an indication of a spatial reuse opportunity; adjust one or more parameters to determine whether or not the wireless medium is in use; and determine whether to transmit within the spatial reuse opportunity based on the adjusted one or more parameters.

In Example 24, the subject matter of Example 23 can optionally include where the instructions are further configured to cause the HEW device to: transmit the packet with a target power or lower, where the target power is one or more from the following group: a sent transmit power indicated in the PHY header or the MAC header, a standard power indicated in a communication protocol specification for use within spatial reuse opportunities, and a reduced power that is lower than a normal power.

In Example 25, the subject matter of Examples 23 and 24 can optionally include where the instructions are further configured to cause the HEW device to: adjust one or more parameters to determine whether or not the wireless medium is in use in accordance with the following conditions: a signal detect (SD) threshold is less than a mid-packet detection (MPD) threshold and the MPD is then than an energy detection (ED) threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station, the apparatus comprising: memory; and processing circuitry coupled to the memory, the processing circuitry configured to:
   decode a media access control (MAC) portion of a first physical layer convergence procedure (PLCP) protocol data unit (PPDU), the MAC portion comprising spatial reuse parameters;
   decode a HE physical (PHY) header of a second PPDU, wherein the HE PHY header comprises a spatial reuse field, and wherein the spatial reuse field indicates whether spatial reuse is allowed during a transmission of the second PPDU; and
   in response to the spatial reuse field indicating spatial reuse is allowed during the transmission of the second PPDU, and a measured received power level of a portion of the HE PHY header being below a power detect threshold, cause the HE station to transmit a third PPDU during a duration of the second PPDU.

2. The apparatus of claim 1, wherein the processing circuitry is further configured to:
   raise the power detect threshold and decrease a transmit power; and
   cause the HE station to transmit the third PPDU using the decreased transmit power.

3. The apparatus of claim 1, wherein in response to a determination that the measured received power level of the portion of the HE PHY header is equal to or above the power detect threshold, then the processing circuitry is further configured to refrain from transmitting the third PPDU during the duration of the second PPDU.

4. The apparatus of claim 1, wherein the processing circuitry is further configured to:
   raise the power detect threshold and decrease a transmit power based on at least one spatial reuse parameter of the spatial reuse parameters, and
   cause the HE station to transmit the third PPDU using the decreased transmit power.

5. The apparatus of claim 1, the processing circuitry is further configured to:
   lower the power detect threshold and raise a transmit power based on at least one spatial reuse parameter of the spatial reuse parameters; and
   cause the HE station to transmit the third PPDU using the raised transmit power.

6. The apparatus of claim 1, wherein the PHY header comprises an indication of the duration of the first PPDU.

7. The apparatus of claim 1, wherein a media access control (MAC) portion of the second PPDU comprises an indication of the duration of the transmission of the second PPDU.

8. The apparatus of claim 1, wherein the processing circuitry is configured to:
   determine a number of timeslots of a backoff counter as a random number between a contention window size and zero; and
   in response to a medium being idle for a timeslot duration, reduce the backoff counter by one.

9. The apparatus of claim 8, wherein the processing circuitry is further configured to:
   determine the medium is idle if during the timeslot duration the measured received energy is less than the power detect threshold.

10. The apparatus of claim 8, wherein the processing circuitry is further configured to:
    in response to the backoff counter reaching zero, configure the HE station to transmit the third PPDU during the duration of the first PPDU.

11. The apparatus of claim 1, wherein the processing circuitry is further configured to:
    in response to a backoff counter of the existing countdown procedure reaching zero, configure the HE station to transmit the third PPDU during the duration of the second PPDU.

12. The apparatus of claim 1, wherein the processing circuitry is further configured to:
    measure a received power level of a legacy portion of the second PPDU; and
    increase a power detect threshold to be larger than the received power level of the legacy portion of the second PPDU.

13. The apparatus of claim 12, wherein the processing circuitry is further configured to:
    decrease a transmit power to be lower by a proportional amount as the power detect threshold is increased.

14. The apparatus of claim 1, wherein the processing circuitry is further configured to:

transmit the third PPDU in accordance with one or both of: orthogonal frequency division multiple access (OFDMA) and multi-user multiple-input multiple-output (MU-MIMO).

15. The apparatus of claim 1, wherein the apparatus further comprises: transceiver circuitry coupled to the processing circuitry; and, one or more antennas coupled to the transceiver circuitry.

16. The apparatus of claim 1, wherein the HE station is configured to operate in accordance with Institute of Electronic and Electrical Engineers (IEEE) 802.11 ax.

17. A non-transitory computer-readable storage medium that stores instructions for execution by one or more processors of a high-efficiency (HE) station, the instructions to configure the one or more processors to:
  decode a media access control (MAC) portion of a first physical layer convergence procedure (PLCP) protocol data unit (PPDU), the MAC portion comprising spatial reuse parameters;
  decode a HE physical (PHY) header of a second PPDU, wherein the HE PHY header comprises a spatial reuse field, and wherein the spatial reuse field indicates whether spatial reuse is allowed during a transmission of the second PPDU; and
  in response to the spatial reuse field indicating spatial reuse is allowed during the transmission of the second PPDU, and a measured received power level of a portion of the HE PHY header being below a power detect threshold, cause the HE station to transmit a third PPDU during a duration of the second PPDU.

18. The non-transitory computer-readable storage medium of claim 17, wherein the instructions further configure the one or more processors to:
  raise the power detect threshold and decrease a transmit power; and
  cause the HE station to transmit the third PPDU using the decreased transmit power.

19. A method performed by an apparatus of a high-efficiency (HE) station, the method comprising:
  decoding a media access control (MAC) portion of a first physical layer convergence procedure (PLCP) protocol data unit (PPDU), the MAC portion comprising spatial reuse parameters;
  decoding a HE physical (PHY) header of a second PPDU, wherein the HE PHY header comprises a spatial reuse field, and wherein the spatial reuse field indicates whether spatial reuse is allowed during a transmission of the second PPDU; and
  in response to the spatial reuse field indicating spatial reuse is allowed during the transmission of the second PPDU, and a measured received power level of a portion of the HE PHY header being below a power detect threshold, causing the HE station to transmit a third PPDU during a duration of the second PPDU.

20. The method of claim 19, the method further comprising:
  raising the power detect threshold and decreasing a transmit power; and
  causing the HE station to transmit the third PPDU using the decreased transmit power.

21. An apparatus of a first high-efficiency (HE) wireless device, the apparatus comprising: memory; and, processing circuitry coupled to the memory, the processing circuitry configured to:
  encode a media access control (MAC) portion of a first physical layer convergence procedure (PLCP) protocol data unit (PPDU), the MAC portion comprising spatial reuse parameters for one or more second HE wireless devices;
  encode a HE physical (PHY) header of a second PPDU, wherein the HE PHY header comprises a spatial reuse field, and wherein the spatial reuse field indicates whether spatial reuse is permitted during a transmission of the second PPDU; and
  cause the HE wireless device to transmit the second PPDU to one or more second HE wireless devices.

22. The apparatus of claim 21, wherein the spatial reuse parameters comprise an indication of a how to raise or lower a transmit power, the transmit power to be used by the one or more stations during transmission of the PPDU.

23. The apparatus of claim 21, wherein the apparatus further comprises: transceiver circuitry coupled to the processing circuitry; and, one or more antennas coupled to the transceiver circuitry.

* * * * *